United States Patent [19]

Hoshino

[11] Patent Number: 5,619,886
[45] Date of Patent: Apr. 15, 1997

[54] OPERABLE ANGLE ADJUSTING STRUCTURE FOR WIPER

[75] Inventor: Takashi Hoshino, Gunma, Japan

[73] Assignee: Mitsuba Electric Manufacturing Co., Ltd., Gunma, Japan

[21] Appl. No.: 439,350

[22] Filed: May 11, 1995

[30] Foreign Application Priority Data

Jun. 30, 1994 [JP] Japan .................... 6-171715

[51] Int. Cl.$^6$ .................................. G05G 1/04
[52] U.S. Cl. .................. 74/522; 74/571 R; 74/588; 403/161; 15/250.13; 15/250.12; 15/250.17
[58] Field of Search ............ 15/250.13, 250.12, 15/250.17; 74/522, 588; 403/161; 24/571 M, 588, 571 R, 571 L, 570; 29/410

[56] References Cited

U.S. PATENT DOCUMENTS

| | | | |
|---|---|---|---|
| 4,149,607 | 4/1979 | Hopkins et al. | 74/571 M |
| 4,231,588 | 11/1980 | Wotton et al. | 403/161 X |
| 4,698,872 | 10/1987 | Watanabe | 15/250.2 |
| 4,723,101 | 2/1988 | Bauer et al. | 15/250.13 X |
| 4,736,484 | 4/1988 | Bauer et al. | 15/250.2 |
| 4,934,014 | 6/1990 | Yamamoto | 15/250.13 |
| 5,201,094 | 4/1993 | Yamamoto et al. | 15/250.13 |
| 5,287,585 | 2/1994 | Yamamoto et al. | 15/250.13 |
| 5,333,351 | 8/1994 | Sato | 15/250.13 |

FOREIGN PATENT DOCUMENTS

| | | |
|---|---|---|
| 1197442 | 12/1959 | France . |
| 2356542 | 1/1978 | France . |
| 2036704 | 1/1972 | Germany . |
| 8715065 | 4/1989 | Germany . |
| 53-7040 | 1/1978 | Japan . |
| 1228176 | 4/1971 | United Kingdom . |

*Primary Examiner*—Vinh T. Luong
*Attorney, Agent, or Firm*—Oliff & Berridge

[57] ABSTRACT

An operable angle adjusting structure for a wiper produces a maximally wide wiping angle is realized within the range where wiper arms will not interfere with window pillars and each other and will not require a precision machining apparatus. A drive link includes a ball joint disposed in one end portion, and the ball joint is integrally mounted to one surface of an adjusting member such that the center axis of the ball joint is eccentric with respect to the center of a screw hole by a specified distance. The adjusting member is turned to change the axis-to-axis distance between a wiper drive shaft and the ball joint for proper adjustment.

17 Claims, 7 Drawing Sheets

OPERABLE ANGLE ADJUSTING STRUCTURE FOR WIPER

BACKGROUND OF THE INVENTION

1. Field of the Invention

The present invention relates to an operable angle adjusting structure for a wiper for wiping windshield surfaces of motor vehicles such as automobiles, buses and trucks.

2. Description of the Related Art

Generally, a wiper has a wiper arm that is driven by a motor to reciprocally swing for wiping a windshield surface. It is desirable for a wiper to have a greater wiping angle for providing a wider field of view. The wiping angle of a wiper arm is determined by an axis-to-axis distance between an axis of a turnable shaft at a proximal end side of a link member and a center axis of a ball joint at a distal end side thereof, the link member being disposed in a power transmission path extending from a motor to a wiper shaft. The longer the axis-to-axis distance, the greater the wiping angle. From this standpoint, it is desirable to set the axis-to-axis distance so that the wiping angle is maximized. Due to manufacturing errors caused when machining and mounting the turnable shaft and the ball joint to the link member, however, the wiping angle may exceed the maximum axis-to-axis distance. This raises a problem that the wiping angle of the wiper arm is increased to such an extent so as to interfere with a pillar.

The above problem can be avoided by employing special precision machining which provides higher accuracy than usual, when machining and mounting the turnable shaft and the ball joint to the link member, or by shortening the axis-to-axis distance in anticipation of the manufacture errors. However, the former method has poor production efficiency and requires a special precision machining apparatus, thus increasing the equipment cost. On the other hand, the latter method is free from the problems of the former method, but the wiping angle is necessarily reduced.

An opposing type wiper comprises a crank arm rotatably driven by a motor, an intermediate link pivotally supported at a middle position, and a connecting rod disposed between the crank arm and the intermediate link for converting a rotating motion of the crank arm into a reciprocal swing motion of the intermediate link. Further, upper and lower ends of the intermediate link are connected respectively to right and left wiper shafts via drive rods, causing right and left wiper arms to be operated for wiping the windshield surface in oppositely moving relation. Additionally, changes in angular speeds of the right and left wiper arms are set to be asymmetrical therebetween so that wiper blades of the right and left wiper arms are overlapped with each other in their lower inverting positions. Specifically, the right and left wiper blades are laid one above the other without interfering with each other, by setting the angular speed of the overlying wiper arm (on the side of a driver's seat) to be larger than that of the underlying wiper arm (on the side of an assistant's seat) in the vicinity of the lower inverting positions.

Thus, the opposing type wiper includes many components, and even a small error significantly affects the wiping angle and often leads to a risk that the wiper arms may interfere with each other. Also, because the angular speeds of the wiper arms are intentionally made different between the driver's side and the passenger's side, high accuracy is required in setting of the components and setting errors result in a significant influence.

SUMMARY OF THE INVENTION

In view of the foregoing state of the art, it is an object of the present invention to provide an operable angle adjusting structure for a wiper that can overcome the drawbacks described above. Specifically, the present invention provides an operable angle adjusting structure for a wiper having a ball joint disposed in one end portion of a link member and a ball retainer disposed on a connecting rod. The ball retainer is supported by the ball joint in such a manner as to rotate through a spherical slide contact. The ball joint is integrally mounted to one surface of an adjusting member. The adjusting member is attached to one surface of the link member and is rotatable for adjustment through a setting shaft fixedly inserted in the ball joint at an eccentric position with respect to the center axis of the ball joint.

In the above operable angle adjusting structure, preferably, an anti-rotation assembly is provided for checking rotation of the adjusting member after adjustment. The anti-rotation assembly is disposed between the other surface of the adjusting member and the one surface of the link member opposing each other.

With the present invention arranged as set forth above, a maximally wide wiping angle can be realized within the range such that the wiper arms will not interfere with the window pillars and each other, without requiring a precision machining apparatus.

BRIEF DESCRIPTION OF THE DRAWINGS

This invention will be described in detail with reference to the following drawings in which like reference numerals refer to like elements and wherein.

DETAILED DESCRIPTION OF THE PREFERRED EMBODIMENT

Figure 1A:
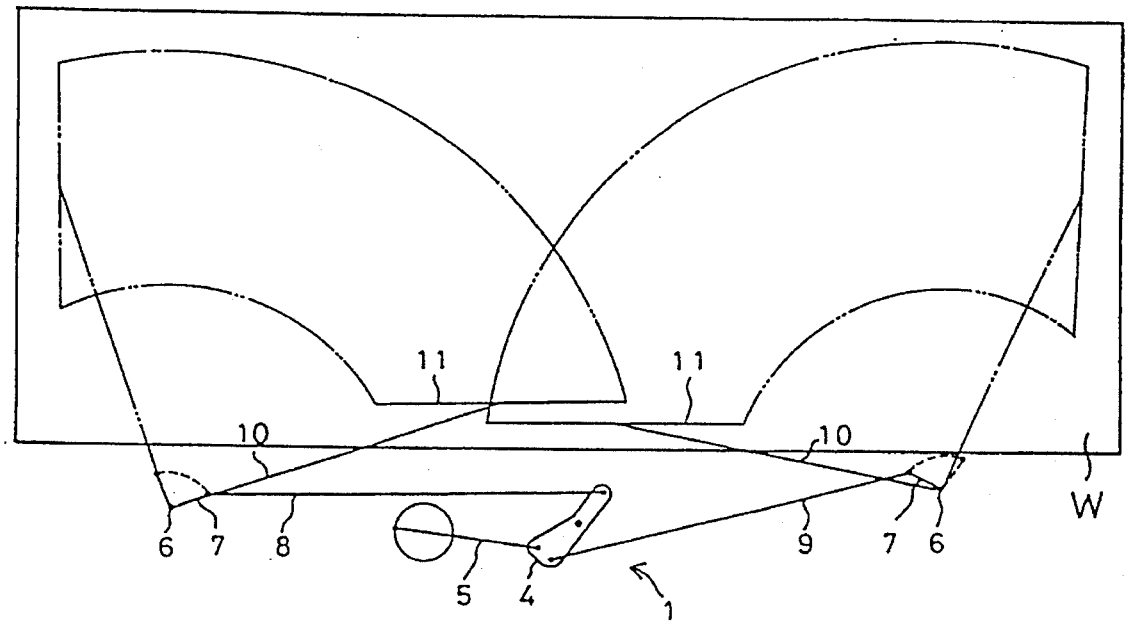
FIG. 1(a) is a schematic front view of an opposing type wiper.

An embodiment of the present invention will be described below with reference to the accompanying drawings. Wiper I is an opposing type wiper, as shown in FIG. 1(a). The wiper 1 comprises a motor 2 equipped with an integral speed reducing mechanism. A crank arm 3 is integrally mounted to an output shaft of the motor 2 for rotation with the output shaft. An intermediate link 4 is pivotally supported at a middle position about a pivot 4a. A connecting rod 5 is coupled between a lower end of the intermediate link 4 and a distal end of the crank arm 3. A pair of right and left wiper drive shafts 6 are disposed laterally of the intermediate link 4 to the left and right, respectively. A right drive rod 8 is coupled between a drive link 7 of the right wiper drive shaft 6 and an upper end of the intermediate link 4. A left drive rod 9 is coupled between a drive link 7 of the left wiper drive shaft 6 and a lower end of the intermediate link 4. A pair of right and left wiper arms 10 are integrally mounted to the right and left wiper drive shafts 6, respectively.

In the above arrangement, the rotating motion of the crank arm 3 driven by the motor 2 is converted into a reciprocal swing motion of the intermediate link 4 coupled to the crank arm 3 through the connecting rod 5, as shown in FIG. 1(a). As the upper and lower ends of the intermediate link 4 swing transversely in opposite directions, the drive links 7 of the right and left wiper drive shafts 6 which are operatively coupled to the upper and lower ends of the intermediate link 4 through the drive rods 8 and 9, respectively, are turned to operate the wiper arms 10 for wiping the windshield surface in oppositely moving relation. The angular speeds of the left and right wiper arms 10 are set to change asymmetrically therebetween in the vicinity of their lower inverting positions, as described later, so that wiper blades 11 are vertically overlapped in the lower inverting positions without interfering with each other, as shown in FIG. 1(a). The left wiper blade 11 on the driver's seat side overlies the right wiper blade 11 on the passenger's seat side.

Figure 1B:
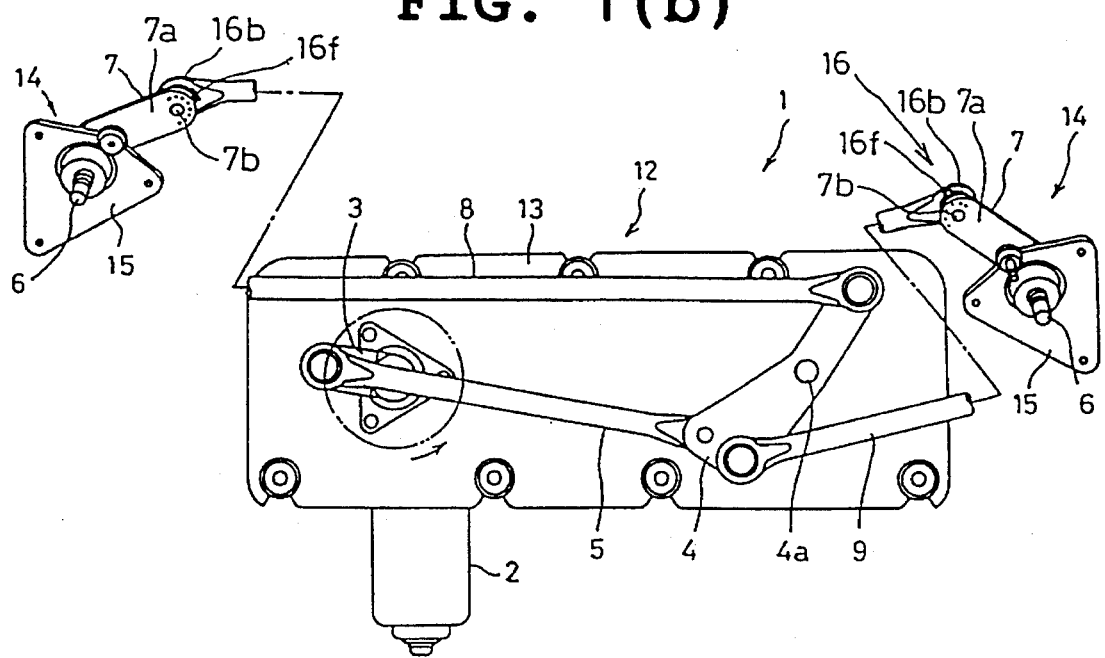
FIG. 1(b) is a front view of principal parts of the wiper.

A drive unit 12 is constructed by integrally mounting the motor 2 and the pivot point 4a of the intermediate link 4 to a motor bracket 13, as shown in FIG. 1(b). The crank arm 3, the connecting rod 5 and the intermediate link 4 are also mounted to the drive unit 12. The length of the connecting rod 5 and its coupling position to the intermediate link (i.e., the distance and the phase angle with respect to the link pivot point) are set so that the actual angular speed of the intermediate link 4 is changed symmetrically between the right and left sides.

Figure 2:
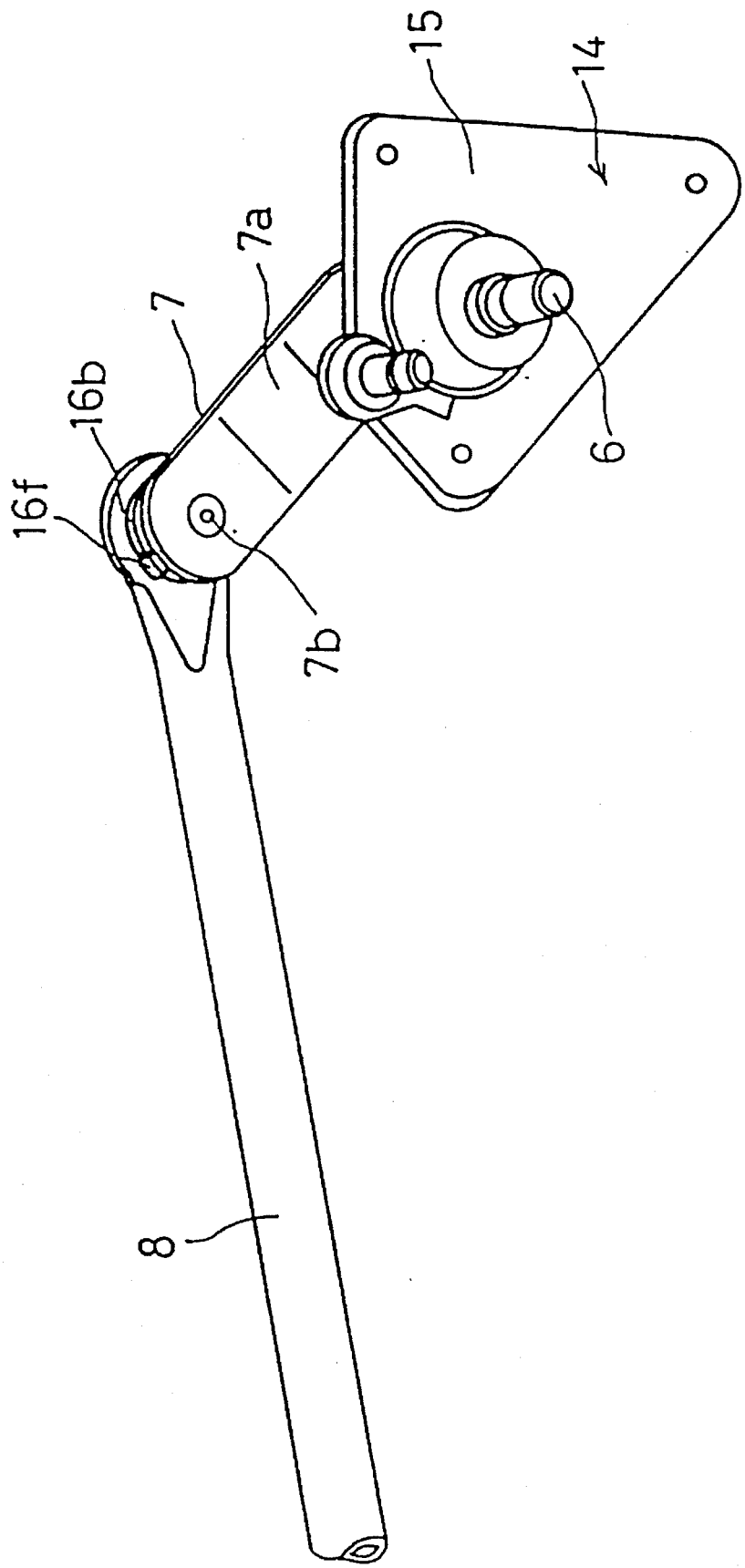
FIG. 2 is a perspective view of a drive link mechanism.

A pair of right and left wiper shaft sleeves 14, as shown in FIG. 2, is constructed by mounting the wiper drive shaft 6 and the drive link 7 to a wiper shaft bracket 15. The wiper shaft sleeves 14 are disposed in respective positions laterally of the drive unit 12 to the right and left. The wiper shaft sleeves 14 are operatively coupled to the intermediate link 4 through the drive rods 8 and 9. The lengths of the drive rods 8 and 9 and their coupling positions to the intermediate link 4 (i.e., the distances and the phase angles with respect to the link pivot point) are set so that angular speeds of the right and left wiper arms 10 are changed asymmetrically between the right and left sides. Specifically, the wiper blades 11 of the right and left wiper arms 10 are laid one above the other at the lower inverting positions without interfering with each other as shown in FIG. 1(a). This is accomplished by setting the angular speed of the right wiper arm 10 to be larger than that of the left wiper arm 10 in the vicinity of the lower inverting positions. In this respect, since the angular speed of the intermediate link 4 is set to change substantially symmetrically between the right and left sides as described above, the angular speeds of the right and left wiper arms 10 are set to change asymmetrically between the right and left sides based on only setting of the lengths of the drive rods 8 and 9 and setting of their coupling positions to the intermediate link 4. When the wiper motor 2 is energized to rotate, the wiper arms 10 are angularly moved in a reciprocal manner, causing the wiper blades 11 to wipe the windshield surface W in a manner depicted in FIG. 1(a).

Figure 3:
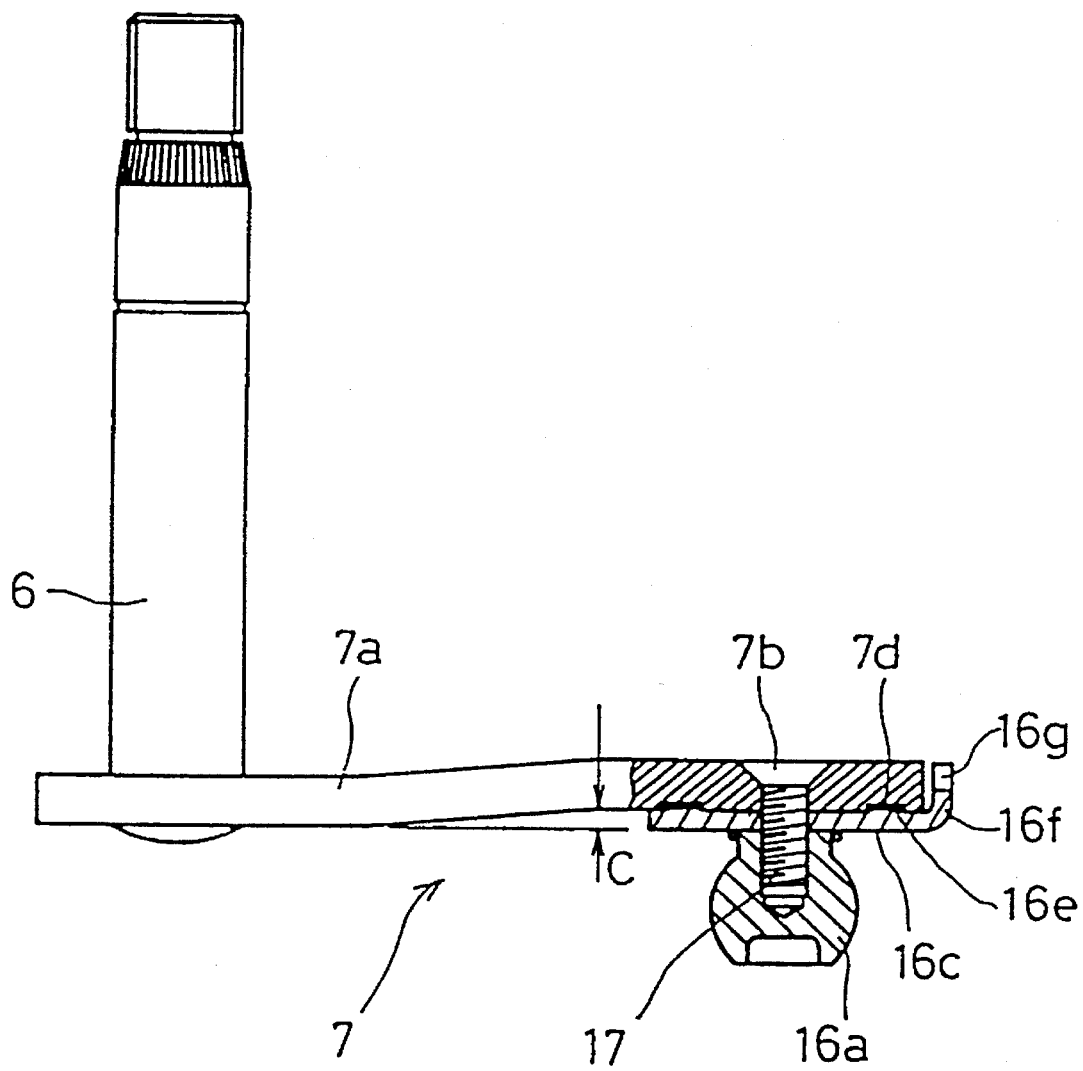
FIG. 3 is a front view of the drive link mechanism with a drive link partly broken away.

Each of the wiper drive shafts 6 is integrally fixed to a proximal end of a link body 7a of the drive link 7. An attachment hole 7b is bored in one end portion of the link body 7a, and the one end portion of the link body 7a has a peripheral edge 7c, as shown in FIG. 5, formed into an arc shape concentric with the attachment hole 7b. A joint assembly 16 for coupling the link body 7a and each of the right and left drive rods 8 and 9 comprises a ball joint 16a, as shown in FIG. 3, attached to the one end portion of the link body 7a. A ball retainer 16b integrally provided on each of the right and left drive rods 8 and 9 is fitted over the ball joint 16a to be able to rotate through a spherical slide contact. The ball joint 16a is attached to one surface of the link body 7a in such a manner that it is eccentric with respect to the attachment hole 7b by a distance a, shown in FIG. 4. More specifically, a proximal end of the ball joint 16a is integrally attached to one surface of a plate-like adjusting member 16c, shown in FIG. 3. A screw hole 16d to which a screw pin 17 (described below) for fixing the ball joint 16a is inserted is bored in each of the adjusting member 16c and the ball joint 16a at a position eccentric with respect to the center axis of the ball joint 16a by the distance α.

The ball joint 16a may be mounted to one surface of the link body 7a by placing the adjusting member 16c into abutment against one surface of the link body 7a, shown in FIG. 3. The screw pin 17 is screwed into the link body 7a until penetrating and entering the screw holes 16d in the adjusting member 16c and the ball joint 16a. The axis-to-axis distance between the center axis of the ball joint 16a and the axis of the wiper shaft 6 can be adjusted by turning the adjusting member 16c about the axis of the screw pin 17 in a condition when the screw pin 17 has been loosened.

Figure 6A:
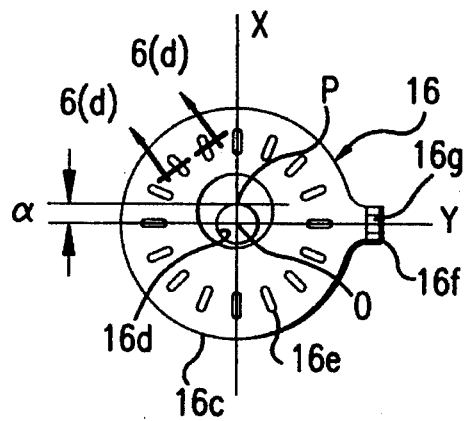
FIG. 6(a) is a front view of a ball joint.
Figure 6B:
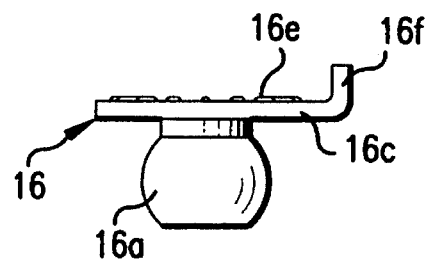
FIG. 6(b) is a plan view of the ball joint.
Figure 6C:
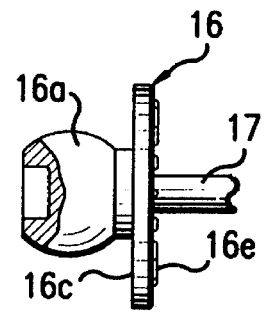
FIG. 6(c) is a side view of the ball joint partly broken.
Figure 6D:
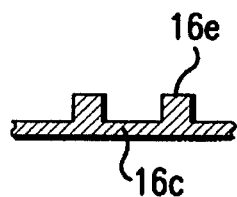
FIG. 6(d) is a sectional view taken along plane 6(d) of FIG. 6(c)

The adjusting member 16c has a peripheral edge with an arc shape concentric with the screw hole 16d, as shown in FIG. 6(a). The adjusting member 16c has a plurality of rectangular anti-rotation projections 16e formed in a radial pattern on a surface of the adjusting member 16c. The projections 16e may have a rectangular cross section, as shown in FIG. 6(d). The link body 7a has a plurality of recesses 7d formed on a surface in a radial pattern to receive the anti-rotation projections 16e. The projections 16e when located within the recesses 7d prevent the adjusting member 16c attached to the link body 7a from rotating. Alternatively, the rectangular projections may extend from the link body 7a and engage recesses in the adjusting member 16c.

A position adjusting tongue 16f, shown in FIGS. 6(a) and (b), projects from a peripheral edge of the adjusting member 16c to extend in a radial direction Y, shown in FIG. 6(a), passing the center O of the screw hole 16d substantially perpendicular to a straight line X that passes the center O of the screw hole 16d and the center axis P of the ball joint 16a. The tongue 16f is bent toward the other surface of the link body 7a and has a nearly L-shape of which leg is extended facing the peripheral edge 7c of the one end portion of the link body 7a. The position of the ball joint 16a can be adjusted within a range Z exceeding 180 degrees, shown in FIG. 7. The tongue 16f comes into abutment against the respective side edges of the link body 7a limiting the adjusting range of the ball joint 16a. Additionally, a notch 16g is formed in a distal end of the tongue 16f. The position of the ball joint 16a may be adjusted by inserting a tool such as a screwdriver into the notch 16g.

Figure 4:
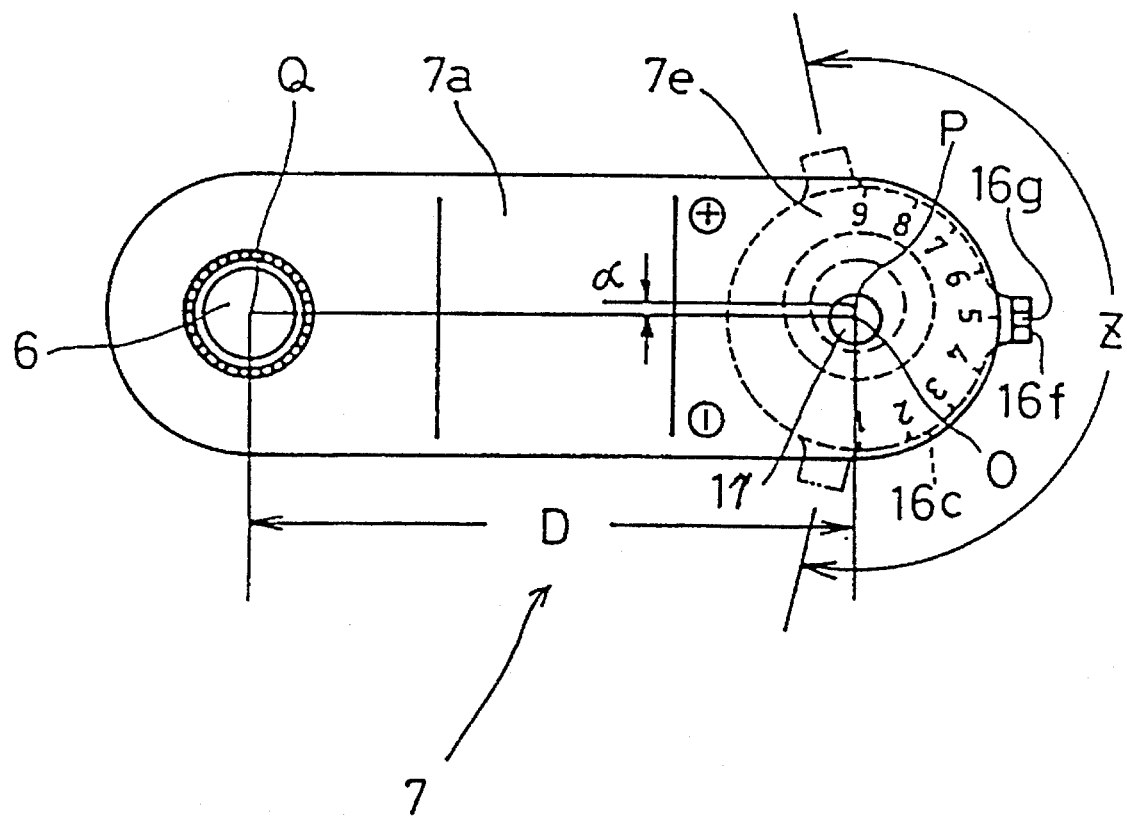
FIG. 4 is a plan view of the drive link.
Figure 5:
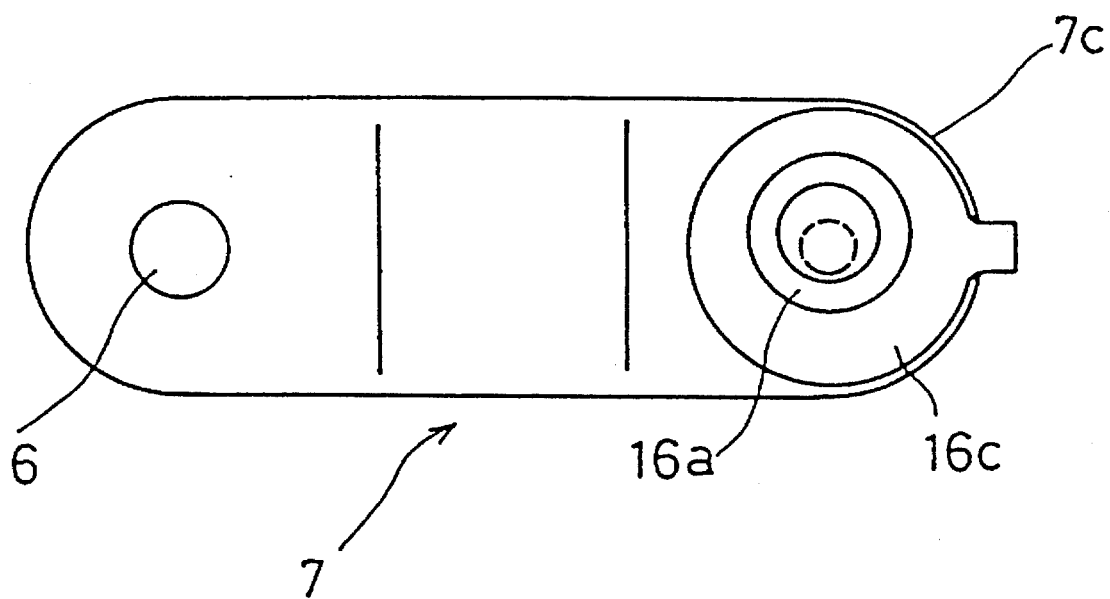
FIG. 5 is a bottom view of the drive link.

On an opposite surface of the link body 7a, graduations 7e numbered from "1" to "9" indicate respective positions of the tongue 16f for adjustment, as shown in FIG. 4. The link body 7a is stepwisely curved at an intermediate portion such that one surface of the link body 7a is recessed toward the opposite surface thereof by a distance corresponding to the thickness C of the adjusting member 16c, shown in FIG. 3. The one surface of the link body 7a at the end adjacent the wiper drive shaft 6 is substantially flush with the one surface of the adjusting member 16c.

The connecting rod 5, which operatively couples the crank arm 3 driven by the motor to rotate and the intermediate link 4 coupled to the right and left wiper drive shafts 6 through the drive rods 8 and 9, is set in its length and its coupling positions to the intermediate link 4 so as to change the actual angular speed of the intermediate link 4 substantially symmetrically between the right and left sides. The angular speeds of the right and left wiper arms 10 are changed asymmetrically between the right and left sides based on setting of the lengths of the drive rods 8 and 9 and setting of their coupling positions to the intermediate link 4. The right and left wiper arms 10 are operated to reciprocally swing, causing the wiper blades 11 to wipe the windshield surface W. When the adjusting member 16c attached to the ball joint 16a is turned to a desired position about the axis of the screw pin 17, the ball joint 16a is turned eccentrically with respect to the center of the screw hole 16d. As a result, the axis-to-axis distance between the ball joint 16a fixed by the screw pin 17 and the wiper drive shaft 6 changes. With this arrangement, the wiping angle of each wiper blade can be simply adjusted to a maximum angle initially intended within the range where the wiper blade will not strike against the pillar, and manufacturing errors of individual products can be surely accommodated. Unlike the prior art, special precision machining which provides higher accuracy than usual is not required to machine and mount the turnable shaft (wiper drive shaft) and the ball joint to the link member.

As described above, in an embodiment of the present invention, the ball joint 16a attached in an eccentric condition is turned about the center of the screw hole 16d to adjust the axis-to-axis distance between the ball joint 16a and the wiper drive shaft 6 for thereby absorbing the manufacturing errors. The wiping angle can be set to an ideal value depending on an extent of the windshield surface, an angle of the windshield surface with respect to the vehicle body, etc. within the range where the wiper arms will not interfere with the window pillars and each other. As a result, the ideal wiping angle initially intended can be easily realized without reducing the wiping angle, i.e., shortening the axis-to-axis distance, to prevent the wiper arms from interfering with the window pillars and each other, nor requiring special precision machining that has poor production efficiency.

Also, after the ball joint 16a is adjusted, the position of the ball joint 16a is prevented from rotating by engagement between the rectangular projections 16e on the adjusting member 16c and the recesses 7d formed in the link body 7a. As a result, when any external force is applied to the wiper arm 10 tending to rotate the ball joint 16a about the axis of screw pin 17, the produced rotating force is borne by vertical walls of the rectangular projections 16e and recesses 7d engaging each other. Accordingly, the ball joint 16a is prevented from deviating from its adjusted position, resulting in high reliability.

Additionally, the ball joint 16a is positioned and checked from rotating by screw pin 17 by which the ball joint 16a is fixed to the link body 7a and the engagement of the rectangular projections 16e with recesses 7d. The stresses produced by the rotating force and the pushing/pulling force exerted on the ball joint 16a are not concentrated on one point, but borne in a distributed manner. Thus, the rotating force is borne by the rectangular projections 16e and recesses 7d engaging with each other, and the pushing/pulling force is borne by the screw pin 17 fixedly screwed in place. As a result, the wiper has superior durability.

The adjusting member 16c can be conveniently adjusted using the tongue 16f projecting from the adjusting member 16c. Since the notch 16g is formed in the tongue 16f, the adjustment can be made by inserting a tool such as a screwdriver into the notch 16g. The adjusting operation can be easily performed even in a condition where the wiper is assembled on the vehicle body and it is difficult for an assemblyman to access to the tongue 16f by a finger.

The tongue 16f projects in the radial direction Y of the screw hole 16d substantially perpendicular to the straight line X that passes the center O of the screw hole 16d and the center axis P of the ball joint 16a. The center axis P of the ball joint 16a is positioned, as shown in FIG. 4, at the central position of the adjustment range, i.e., with the tongue 16f set to the position of the number "5" on the gradations. In such an orientation, the axis-to-axis distance between the axis Q of the wiper drive shaft 6 and the center axis P of the ball joint 16a is substantially equal to the distance D between the center O of the screw hole 16d and the axis Q of the wiper drive shaft 6.

Figure 7:
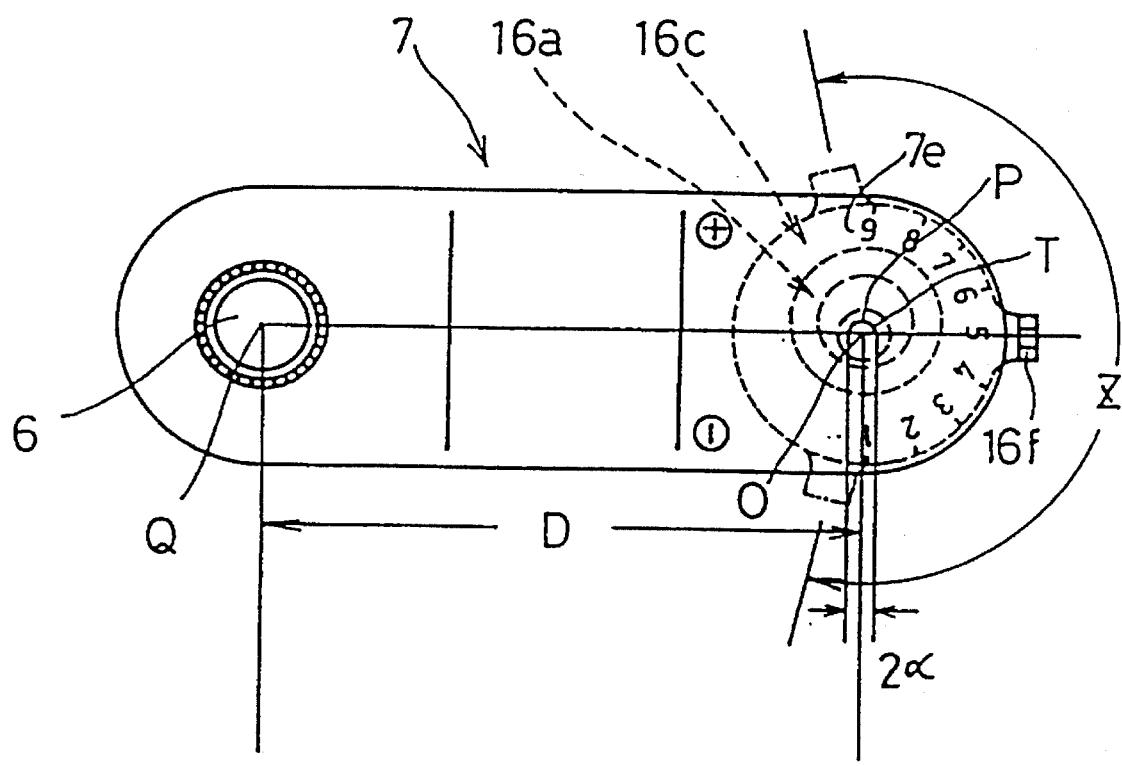
FIG. 7 is a view of a mechanism for adjusting an eccentric condition.

When the tongue 16f is turned to the side of "+" mark, the center axis P of the ball joint 16a is displaced toward the wiper drive shaft 6 while following the path in the form of an arc-shaped line about the center O of the screw hole 16d, as shown in FIG. 7. Accordingly, the axis-to-axis distance between the axis Q of the wiper drive shaft 6 and the center axis P of the ball joint 16a can be adjusted to become shorter (i.e., increasing the wiping angle of the wiper arm). The amount by which the axis-to-axis distance is adjusted is maximized when the tongue 16f is swung from the central position to the number "9" on the gradations by 90 degrees. The maximum amount of adjustment corresponds to the eccentricity α of the ball joint 16a.

When the tongue 16f is turned to the side of "−" mark, the axis-to-axis distance can be adjusted to become longer (i.e., reducing the wiping angle of the wiper arm) by a distance corresponding to the maximum eccentricity α. As a result, the axis-to-axis distance can be adjusted totally by an amount twice the eccentricity α, which is advantageous in providing a wide adjustment range. The adjustment of the axis-to-axis distance is restricted by tongue 16f abutting the link body 7a in such a manner as not to exceed the positions between which the amount of adjustment is doubled (i.e., the positions of numbers "1" and "9" on the gradations). There is no risk that the ball joint 16a may be excessively rotated and the assemblyman may miss the adjustment position. Moreover, the gradations are numbered by integers from "1" to "9" to avoid misreading by the assemblyman which may occur when the scale is graduated by "0" at the central value and then "+1" to "+4" and "−1" to "−4" successively from "0" on each side.

The tongue 16f is bent toward the other surface of the link body 7a to have a nearly L-shape and the peripheral edge 7c of the one end portion of the link body 7a is in the form of an arc about the center of the screw hole 16d. The adjusting operation can be performed by turning the tongue 16f along the arc-shaped peripheral edge 7c with good working efficiency. Since the gradations 7e are formed on the other surface of the link body 7a, the assemblyman can recognize the adjustment position in a quantitative manner by looking at the gradations 7e. As a result, the axis-to-axis distance can be easily adjusted with higher accuracy.

Still another advantage, the link body 7a is stepwisely curved in its intermediate portion such that the one surface of the link body is recessed toward the other surface thereof by a distance corresponding to the thickness C of the adjusting member 16c. The one surface of the link body 7a on the same side as the wiper drive shaft 6 is kept substantially flush with the one surface of the adjusting member 16c. As a result, the link body 7a can be flat on the side of one surface thereof even with the presence of the adjusting member 16c thereon.

The present invention is not limited to the above-described embodiment. For example, the present invention is also applicable to a ball joint by which a connecting rod is coupled to, rather than the drive link, a drive arm having a proximal end integrally fixed to the output shaft of the wiper motor. In this modified case, the output shaft corresponds to the wiper shaft and the crank arm corresponds to the wiper link. Further, the present invention is similarly applicable to a ball joint for the intermediate link.

In short, according to the present invention described above, the axis-to-axis distance between the ball joint and the wiper drive shaft can be adjusted by turning the ball joint to which the connecting rod is coupled in such a manner as to be able to rotate through a spherical slide contact, about the axis of the screw pin by which the ball joint is attached to the link member. As a result, the manufacturing errors can be absorbed and the wiping angle of each wiper arm can be set to a maximum value depending on an extent of the windshield surface, an angle of the windshield surface with respect to the vehicle body, etc. within the range where the wiper arms will not interfere with the window pillars and each other. Thus, the maximum wiping angle initially intended can be easily realized without reducing the wiping angle, i.e., shortening the axis-to-axis distance, to prevent the wiper arms from interfering with the window pillars and each other, nor requiring special precision machining that has poor production efficiency.

What is claimed is:

1. An operable angle adjusting assembly for a wiper for use on a vehicle to produce a wiping angle initially intended comprising:

a drive link;

a ball joint attached to a first end of the drive link by a pin having an axis such that the ball joint is eccentric relative to the axis of the pin;

a drive rod attached to the first end of the drive link by a ball retainer;

an adjusting member interposed between the ball joint and the first end of the drive link such that rotating the adjusting member adjusts an operating angle between the drive rod and the drive link; and a rotation prevention assembly that prevents rotation between said adjusting member and said drive link, the rotation prevention assembly including at least one projection extending from one of said drive link and said adjusting member, said at least one projection engaging a complementary recess in the other one of said drive link and said adjusting member opposite said at least one projection.

2. The assembly according to claim 1, wherein the ball joint has a center axis and said adjusting member is rotatable about an adjustment axis eccentric with said center axis.

3. The assembly according to claim 2, further comprising a drive shaft positioned on a second end of said drive link and having an axis, wherein an axis-to-axis distance between said drive shaft axis and said center axis of the ball joint is an adjustable distance equal to up to twice an eccentricity between said adjustment axis and said center axis.

4. The assembly according to claim 2, wherein said adjusting member is rotatable about a setting shaft.

5. The assembly according to claim 4, wherein said ball retainer is rotatably supported on said ball joint.

6. The assembly according to claim 1, further comprising a tongue extending from said adjusting member for adjusting the position of said adjusting member.

7. The assembly according to claim 6, wherein said tongue is bent toward said drive link.

8. The assembly according to claim 7, wherein the first end of the drive link has a periphery having an arc shape and the tongue engages the periphery to limit movement of the adjusting member with respect to the drive link.

9. The assembly according to claim 8, further comprising a plurality of indexes on the drive link for positioning the tongue relative to one of the plurality of indexes to set the adjusting member to an operating angle.

10. The assembly according to claim 1, wherein the drive link includes an angled portion such that said adjusting member and a second end of the drive link are positioned within a common plane.

11. An operable angle adjusting assembly for a wiper for use on a vehicle comprising:

a drive link;

a ball joint attached to a first end of the drive link by a pin having an axis such that the ball joint is eccentric relative to the axis of the pin;

a drive rod attached to the first end of the drive link by a ball retainer;

adjusting means interposed between the ball joint and the first end of the drive link such that rotating the adjusting means adjusts an operating angle between the drive rod and the drive link; and rotation prevention means for preventing rotation between the adjusting means and the drive link, the rotation prevention means including at least one projection extending from one of said drive link and said adjusting member, said at least one projection engaging a complementary recess in the other one of said drive link and said adjusting member opposite said at least one projection.

12. The assembly according to claim 11, wherein said adjusting means adjusts a distance between the ball joint and a drive shaft disposed at a second end of the drive link.

13. The assembly according to claim 11, wherein said adjusting means is rotatable with respect to said drive link.

14. The assembly according to claim 11, further comprising tongue means for adjusting the position of the adjusting means to an operating angle to produce said maximum wiping angle.

15. The assembly according to claim 14, wherein the tongue means also limits the rotation of said adjusting means.

16. The assembly according to claim 15, further comprising index means on the drive link for positioning the tongue means relative to the index means to set the adjusting means to an operating angle.

17. An operable angle adjusting assembly for a wiper for use on a vehicle comprising:

a drive link;

a ball joint attached to a first end of the drive link by a pin having an axis such that the ball joint is eccentric relative to the axis of the pin;

a drive rod attached to the first end of the drive link by a ball retainer;

a drive shaft having an axis at a second end of the drive link;

adjusting means for adjusting the distance between the ball joint and the axis of the drive shaft; and rotation prevention means for preventing rotation between the adjusting means and the drive link, the rotation prevention means including at least one projection extending from one of said drive link and said adjusting member, said at least one projection engaging a complementary recess in the other one of said drive link and said adjusting member opposite said at least one projection.

* * * * *